(12) United States Patent
Akutsu

(10) Patent No.: US 9,389,818 B2
(45) Date of Patent: Jul. 12, 2016

(54) INFORMATION PROCESSING APPARATUS, NON-TRANSITORY PROGRAM PRODUCT, AND INFORMATION DISPLAY APPARATUS

(75) Inventor: Toru Akutsu, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 102 days.

(21) Appl. No.: 13/540,738

(22) Filed: Jul. 3, 2012

(65) Prior Publication Data

US 2013/0016395 A1 Jan. 17, 2013

(30) Foreign Application Priority Data

Jul. 15, 2011 (JP) ................. 2011-157178

(51) Int. Cl.
*G06K 15/02* (2006.01)
*G06F 3/12* (2006.01)

(52) U.S. Cl.
CPC ............ *G06F 3/1239* (2013.01); *G06F 3/1219* (2013.01); *G06F 3/1288* (2013.01)

(58) Field of Classification Search
None
See application file for complete search history.

(56) References Cited

U.S. PATENT DOCUMENTS

| | | | |
|---|---|---|---|
| 8,380,889 B2* | 2/2013 | Sretenovic | 710/15 |
| 2005/0024670 A1* | 2/2005 | Aoki | 358/1.13 |
| 2007/0253014 A1* | 11/2007 | Nakata | 358/1.14 |
| 2008/0246993 A1 | 10/2008 | Murakami et al. | |
| 2008/0273224 A1* | 11/2008 | Maulsby et al. | 358/1.15 |
| 2009/0147306 A1* | 6/2009 | Sugiyama | 358/1.15 |
| 2010/0195138 A1* | 8/2010 | DeRoller | 358/1.15 |
| 2011/0188073 A1 | 8/2011 | Akutsu | |
| 2011/0304864 A1* | 12/2011 | Akutsu | 358/1.9 |

FOREIGN PATENT DOCUMENTS

| | | |
|---|---|---|
| JP | 2004102356 A | 4/2004 |
| JP | 2005339383 A | 12/2005 |
| JP | 2006-099714 A | 4/2006 |
| JP | 2007293703 A | 11/2007 |
| JP | 2008-134443 A | 6/2008 |
| JP | 2008171279 A | 7/2008 |
| JP | 2008-257370 A | 10/2008 |
| JP | 2009181275 A | 8/2009 |
| JP | 2010-191570 A | 9/2010 |
| JP | 2011159193 A | 8/2011 |
| JP | 2011259283 A | 12/2011 |

OTHER PUBLICATIONS

US-20110188073 corresponds to JP-2011159193-A.
US-20110304864 corresponds to JP-2011259283-A.
US-20070253014 corresponds to JP-2007293703-A.
Office Action for corresponding Japanese Patent Application No. 2011-157178 issued on Jun. 30, 2015.

* cited by examiner

*Primary Examiner* — Mohammad Ghayour
*Assistant Examiner* — Pawandeep Dhingra
(74) *Attorney, Agent, or Firm* — Harness, Dickey & Pierce, P.L.C.

(57) ABSTRACT

An information processing system which executes a job is disclosed, including a user specifying unit; a user information obtaining unit; an applied rule determining unit which refers to rule information in which is recorded a rule to be applied for executing the job in accordance with a relationship between an upper limit value and a consumed amount to determine the rule to be applied to the user; an applying unit which applies the rule determined by the applied rule determining unit to setting information of the job to be executed; and a log recording unit which records, with respect to the job to be executed, log information which includes at least one of the setting information before application of the rule and the setting information after application of the rule; and information indicating the rule applied.

20 Claims, 16 Drawing Sheets

FIG.9

| USER NAME | USER A |
|---|---|
| PRIVILEGE INFORMATION | COPY, PRINTING |
| AFFILIATED GROUP NAME | GROUP A |
| UPPER LIMIT VALUE | 25 |
| CONSUMED AMOUNT | 15 |
| : | : |

| CONSUMED RATE(%) | RULE |
|---|---|
| 80 | FORCED DOUBLE FACE |
| 90 | FORCED MONOCHROME |
| 100 | FORCED DELETION |

FIG.11A

```
<accountLog startTime="20110530103042" endTime="20110530103230" >  ~Er1
  <user name="aaa" />  ~Eu1
  <account type="print" rule = "1" del="0"> //PRINTING(FORCED MONOCHROME)
    <attributes>
      <attribute code="color"    value="1" /> //COLOR MODE(MONOCHROME)
      <attribute code="twosides" value="0" /> //PRINTING FACE(FRONT)
      <attribute code="size"     value="1" /> //SHEET SIZE
    </attributes>
    2 //NUMBER OF PAGES    ~Ep1
  </account>
  <account type="print" rule = "1" del="1"> //DELETE BY USER INSTRUCTION ACCORDING TO RULE APPLICATION
    <attributes>
      <attribute code="color"    value="1" /> //COLOR MODE(MONOCHROME)
      <attribute code="twosides" value="0" /> //PRINTING FACE(FRONT)
      <attribute code="size"     value="1" /> //SHEET SIZE
    </attributes>
    2 //NUMBER OF PAGES
  </account>
  <account type="print" rule = "4" del="2"> //FORCED DELETION
    <attributes>
      <attribute code="color"    value="1" /> //COLOR MODE(MONOCHROME)
      <attribute code="twosides" value="0" /> //PRINTING FACE(FRONT)
      <attribute code="size"     value="1" /> //SHEET SIZE
    </attributes>
    2 //NUMBER OF PAGES
  </account>
```

Eat1, Eac1, Eac2, Eac3, L1

FIG.11B

```
<account type="print" rule ="3" del="0"> //PRINTING(FORCED MONOCHROME & FORCED DOUBLE FACE)
    <attributes>
        <attribute code="color" value="1" /> //COLOR MODE(MONOCHROME)
        <attribute code="twosides" value="1" /> //PRINTING FACE(FRONT)
        <attribute code="size" value="1" /> //SHEET SIZE
    </attributes>
    2 //NUMBER OF PAGES
</account>                                                                              ---- Eac4
<account type="print" rule="3" del="0"> //PRINTING (FORCED MONOCHROME & FORCED DOUBLE FACE)
    <attributes>
        <attribute code="color" value="1" /> //COLOR MODE(MONOCHROME)
        <attribute code="twosides" value="2" /> //PRINTING FACE(BACK)
        <attribute code="size" value="1" /> //SHEET SIZE
    </attributes>
    2 //NUMBER OF PAGES
</account>                                                                              ---- Eac5
</accountLog>
```

L1

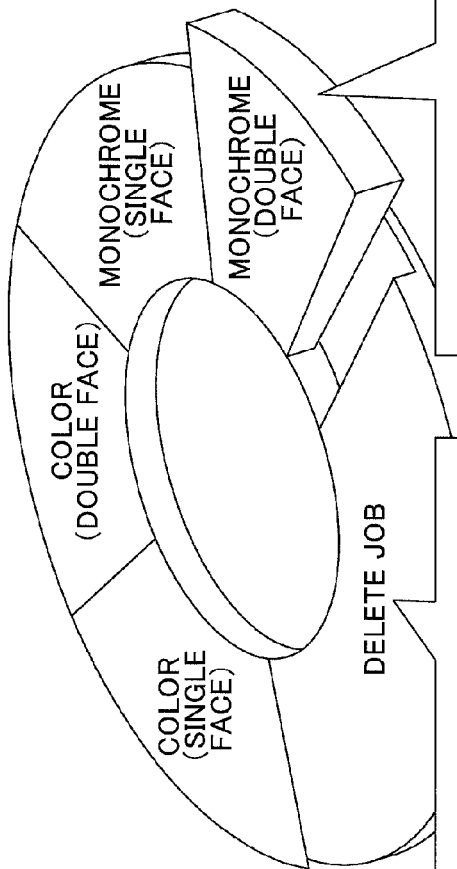

FIG.16

```
<account type="copy" rule = "1" del="0">  //COPY(FORCED MONOCHROME)
    <attributes>
        <attribute code="color" value="1" />  //COLOR MODE(BLACK/WHITE)
        <attribute code="twosides" value="0" />  //PRINTING FACE(FRONT)
        <attribute code="size" value="1" />  //SHEET SIZE
    </attributes>
    <quantities>
        <quantity code="page" value="2" />  //NUMBER OF PAGES
    </quantities>
</account>
```

INFORMATION PROCESSING APPARATUS, NON-TRANSITORY PROGRAM PRODUCT, AND INFORMATION DISPLAY APPARATUS

TECHNICAL FIELD

The present invention relates to information processing apparatuses, non-transitory program products, and information display apparatuses.

BACKGROUND ART

In companies, in relation to use of image forming apparatuses, various measures are being taken to reduce wasteful printing or wasteful copying for the purpose of reducing TCO (total cost of ownership). As one of such measures, execution of printing or copying at a relatively low cost mode such as monochrome printing, monochrome copying, etc., is being promoted. Moreover, there are also companies which introduce an information processing system for restricting (for example, restricting color printing, etc.) setting information related to a printing job, a copying job, etc., and for determining a usage status of the image forming apparatus.

For example, Patent document 1 discloses a printing system which includes a function of restricting the number of sheets printed for each user.

PATENT DOCUMENT

Patent Document 1: JP2005-339383A

However, while it is possible to check reduction effects as a whole, it is difficult to determine which measure is effective. For example, even if it is possible to determine the number of sheets onto which monochrome printing is conducted, it is difficult to determine whether the monochrome printing is selected as intended by the user or the information processing system forces a change to the monochrome printing.

DISCLOSURE OF THE INVENTION

In light of the problems as described above, an object of the present invention is to provide an information processing apparatus, a non-transitory program product, and an information display apparatus that may assist in determining factors of cost reduction.

According to an embodiment of the present invention, an information processing system which executes a job is provided, including a user specifying unit which specifies information identifying a user which causes the information processing apparatus to execute the job; a user information obtaining unit which obtains a consumed amount relative to an upper limit value of a parameter whose value is consumed according to setting information of the job executed by the user that is stored in association with the identifying information; an applied rule determining unit which refers to rule information in which is recorded a rule to be applied for executing the job in accordance with a relationship between the upper limit value and the consumed amount to determine the rule to be applied to the user; an applying unit which applies the rule determined by the applied rule determining unit to setting information of the job to be executed; and a log recording unit which records, with respect to the job to be executed, log information which includes at least one of the setting information before application of the rule and the setting information after application of the rule; and information indicating the rule applied.

The advantage of the present invention is to determine factors of cost reduction.

BRIEF DESCRIPTION OF THE DRAWINGS

Other objects, features, and advantages of the present invention will become more apparent from the following detailed descriptions when read in conjunction with the accompanying drawings, in which:

FIG. 9 is a diagram illustrating an exemplary configuration of user information;

FIG. 10 is a diagram illustrating an exemplary configuration of a rule storage unit;

FIGS. 11A and 11B are diagrams illustrating exemplary log information related to the printing job;

FIG. 15 is a diagram illustrating one example of a display format of results of collecting log information; and FIG. 16 is a diagram illustrating exemplary log information related to a copying job.

BEST MODE FOR CARRYING OUT THE INVENTION

Figure 1:
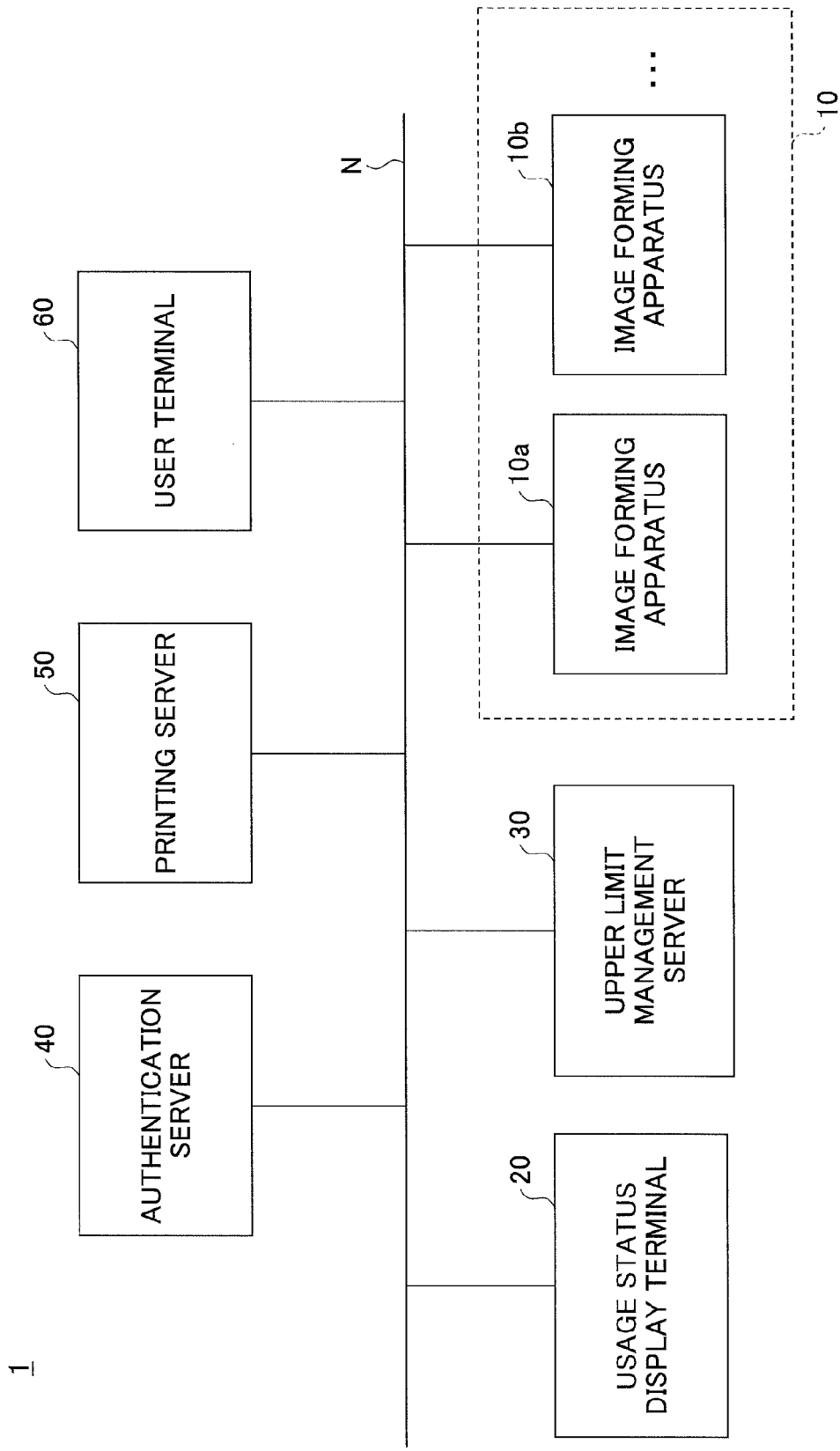
FIG. 1 is an exemplary configuration diagram of an information processing system according to an embodiment of the present invention.

Below, an embodiment of the present invention is explained with reference to the drawings. FIG. 1 is an exemplary configuration diagram of an information processing system according to an embodiment of the present invention. In an information processing system 1 shown, one or more image forming apparatuses 10a and 10b, etc., (below called "an image forming apparatus 10" if distinctions are not made), a user terminal 60, a printing server 50, an upper limit management server 30, an authentication server 40, a usage status display terminal 20, etc., are communicatively connected via a network N (wired or wireless) such as a LAN (local area network) or the Internet.

The image forming apparatus 10 is an equipment unit (i.e., a multi-functional unit) which realizes two or more functions out of printing, scanning, copying, FAX transmitting and receiving, etc., in one housing. An equipment unit which includes any one function as a separate body may be used as an image forming apparatus 10. In the present embodiment, the image forming apparatus 10 may include a printing function.

The user terminal 60 is a computer which generates a printing job (printing data) in response to an instruction input by a user and transmits the generated printing job to the printing server 50.

The printing server 50 stores (accumulates or spools) the printing job transferred from the user terminal 60 to realize an accumulated document printing function. The accumulated document printing function is a function in which, in response to a printing instruction by the user, a printing job is not immediately executed, but accumulated, and the accumulated printing job is executed in response to an operation of a user on the image forming apparatus 10 side. Therefore, the printing server 50 transfers a printing job stored in the image forming apparatus 10 in response to a request from the image forming apparatus 10. The printing job may be accumulated into the image forming apparatus 10.

The upper limit management server 30 is a computer which executes a process for restricting executions of a printing job by the image forming apparatus 10 in accordance with usage status by the user. Moreover, the upper limit management server 30 receives and stores log information on the printing job by the image forming apparatus 10.

The authentication server 40 is a computer which authenticates the user which causes the image forming apparatus 10 to execute the printing job. An Active Directory server, an LDAP (lightweight directory access protocol) server, etc., may be utilized as the authentication server 40.

The usage status display terminal 20 is a computer which displays information indicating the usage status of the image forming apparatus 10 based on log information stored by the upper limit management server 30.

Figure 2:
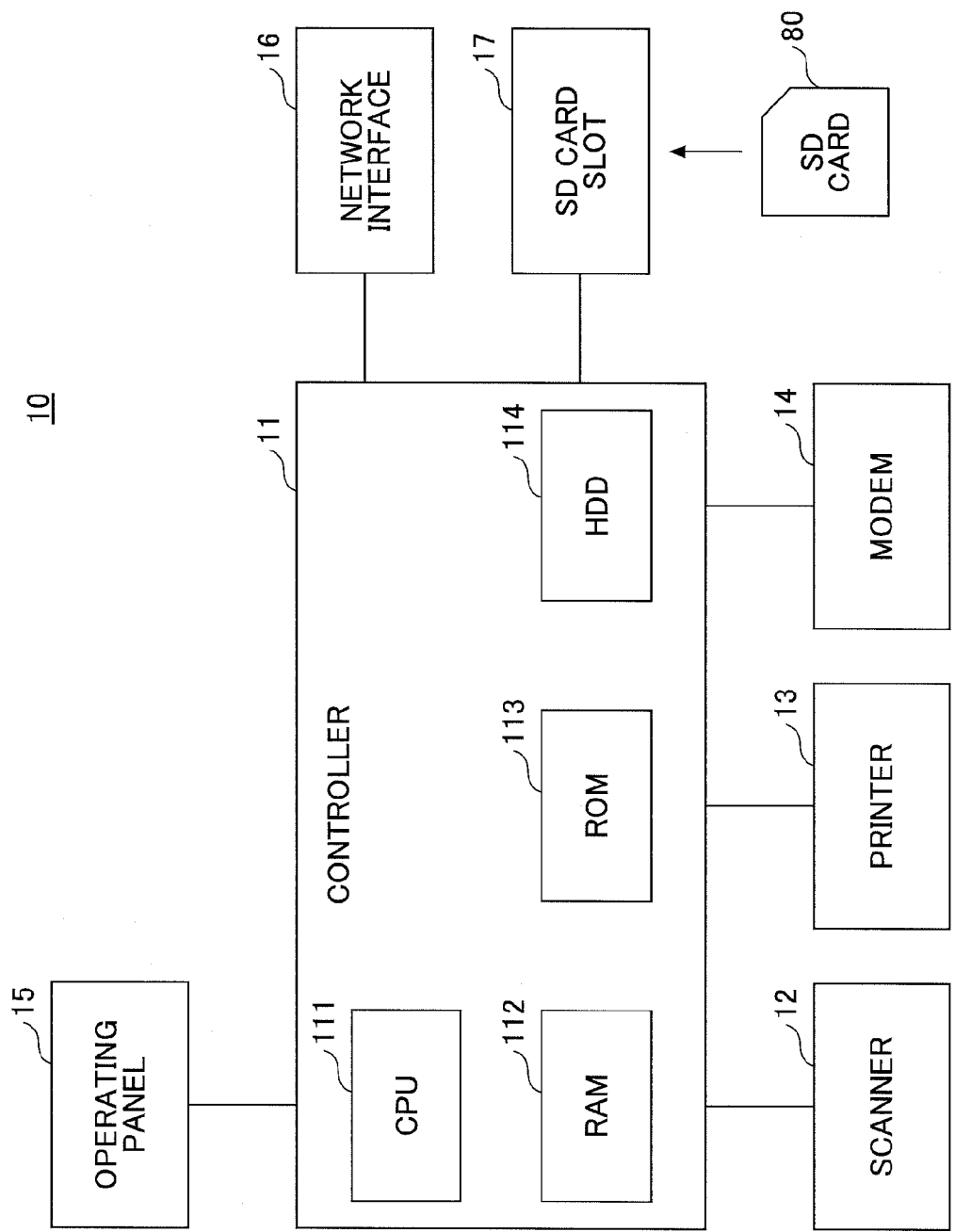
FIG. 2 is a diagram showing an exemplary hardware configuration of an image forming apparatus according to the embodiment of the present invention.

FIG. 2 is a diagram showing an exemplary hardware configuration of an image forming apparatus according to the embodiment of the present invention. The image apparatuses 10 shown include hardware units such as a controller 11, a scanner 12, a printer 13, a modem 14, an operating panel 15, a network interface 16, an SD card slot 17, etc.

The controller 11 includes a CPU 111, an RAM 112, an ROM 113, an HDD 114, an NVRAM 115, etc. In the ROM 113 are recorded various programs, data sets, etc., used by the programs. The RAM 112 is used as a storage area for loading a program, a work area for the loaded program, etc. The CPU 111 realizes various functions by processing the program loaded in the RAM 112. In the HDD 114 are recorded various programs, data sets, etc., used by the programs. In the NVRAM 115 are recorded various setting information sets, etc.

The scanner 12 is a hardware unit (an image reading unit) for reading image data from a manuscript. The printer 13 is a hardware unit (a printing unit) for printing a printing data set onto a printing sheet. The modem 14, which is a hardware unit for connecting to a telephone circuit, is used for executing, transmitting and receiving image data by facsimile communications. The operating panel 15 is a hardware unit which includes an input unit such as a button, etc., that is for accepting an input from the user; and a display unit such as a liquid crystal panel, etc. The liquid crystal panel may include a touch panel function. In this case, the liquid crystal panel also serves the function of the input unit. The network interface 16 is a hardware unit for connecting to a network (wired or wireless) such as a LAN, etc. The SD card slot 17 is used for reading a program recorded in an SD card 80. In other words, in the image forming apparatus 10, not only a program recorded in the ROM 113 but also a program recorded in the SD card 80 may be loaded into the RAM 112 and executed. The SD card 80 may be replaced by a different recording medium (for example, a CD-ROM, a USB (universal serial bus) memory, etc.). In other words, the type of recording medium corresponding to the positioning of the SD card 80 is not limited to predetermined ones. In this case, the SD card slot 17 may be replaced with a hardware unit in accordance with the type of recording medium.

Figure 3:
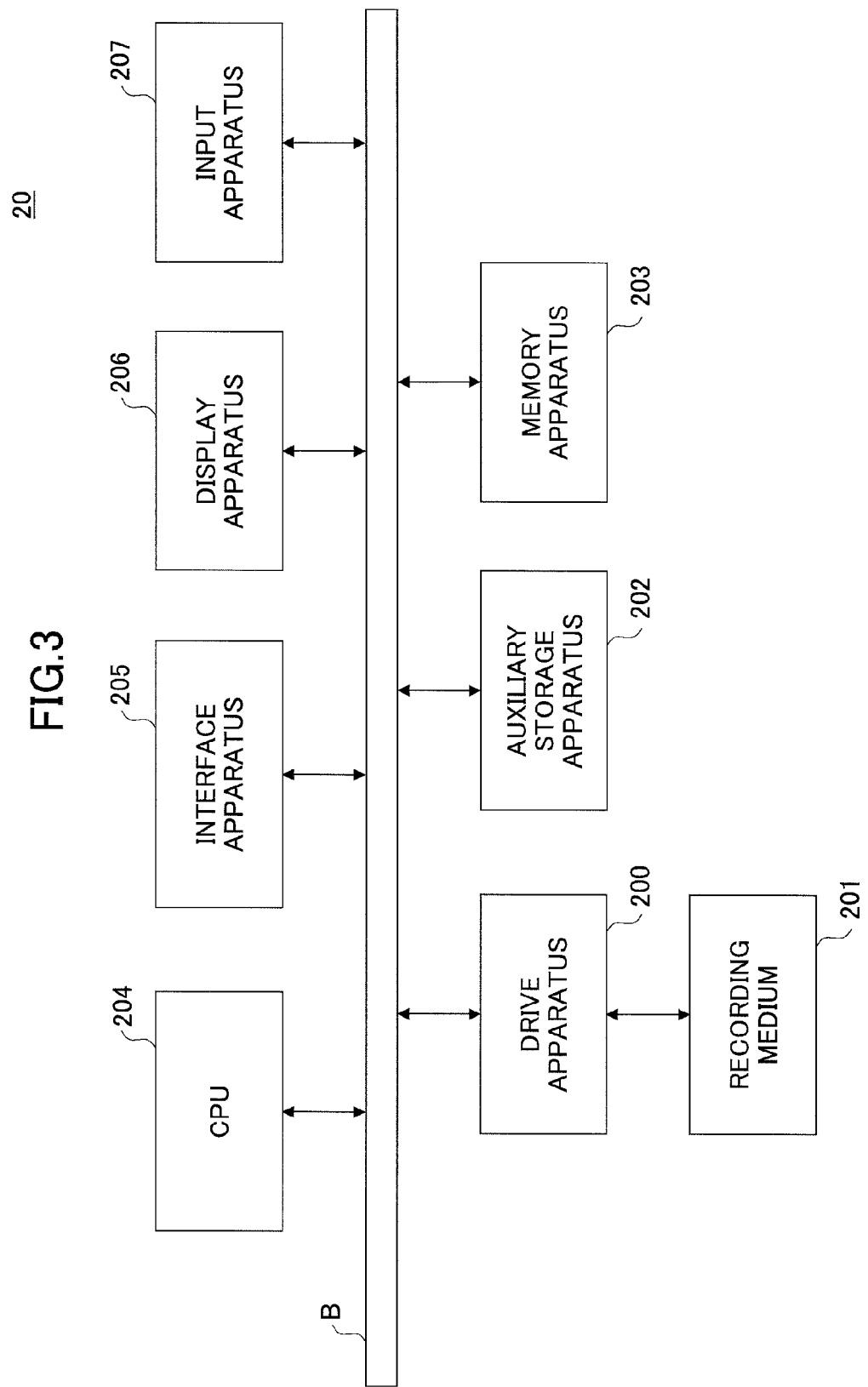
FIG. 3 is a diagram showing an exemplary hardware configuration of a usage status display terminal according to the embodiment of the present invention.

FIG. 3 is a diagram showing an exemplary hardware configuration of a usage status display terminal according to an embodiment of the present invention. The usage status display terminal 20 in FIG. 3 includes an input apparatus 207; a display apparatus 206; an interface apparatus 205; a CPU 204; a memory apparatus 203; an auxiliary storage apparatus 202; and a drive apparatus 200, which are mutually connected by a bus B.

A program which realizes a function at the usage status display terminal 20 is provided by a recording medium 201 such as a CD-ROM, etc. When the recording medium 201 having recorded the program therein is set in the drive apparatus 200, the program is installed from the recording medium 201 to the auxiliary storage apparatus 202 via the drive apparatus 200. It is not necessary for the program to be installed from the recording medium 201, so that it may be downloaded from a different computer via a network. The auxiliary storage apparatus 202 stores a required file, data, etc., as well as the installed program.

When there is an instruction to launch the program, the memory apparatus 203 receives the program from the auxiliary storage apparatus 202 to store the read program. The CPU 204 realizes a function related to the usage status display terminal 20 in accordance with a program stored in the memory apparatus 203. The interface apparatus 205 is used as an interface for connecting to the network. The display apparatus 206 displays a GUI (graphical user interface), etc., by a program. The input apparatus 207, which includes a keyboard, a mouse, etc., is used for inputting various operating instructions.

The user terminal 60 may also include hardware units as in FIG. 3. Moreover, the same hardware unit as FIG. 3 may be included for the upper limit management server 30, the authentication server 40, and the printing server 50. For the upper limit management server 30, the authentication server 40, and the printing server 50, the display apparatus 206 and the input apparatus 207 are not necessary.

Figure 4:
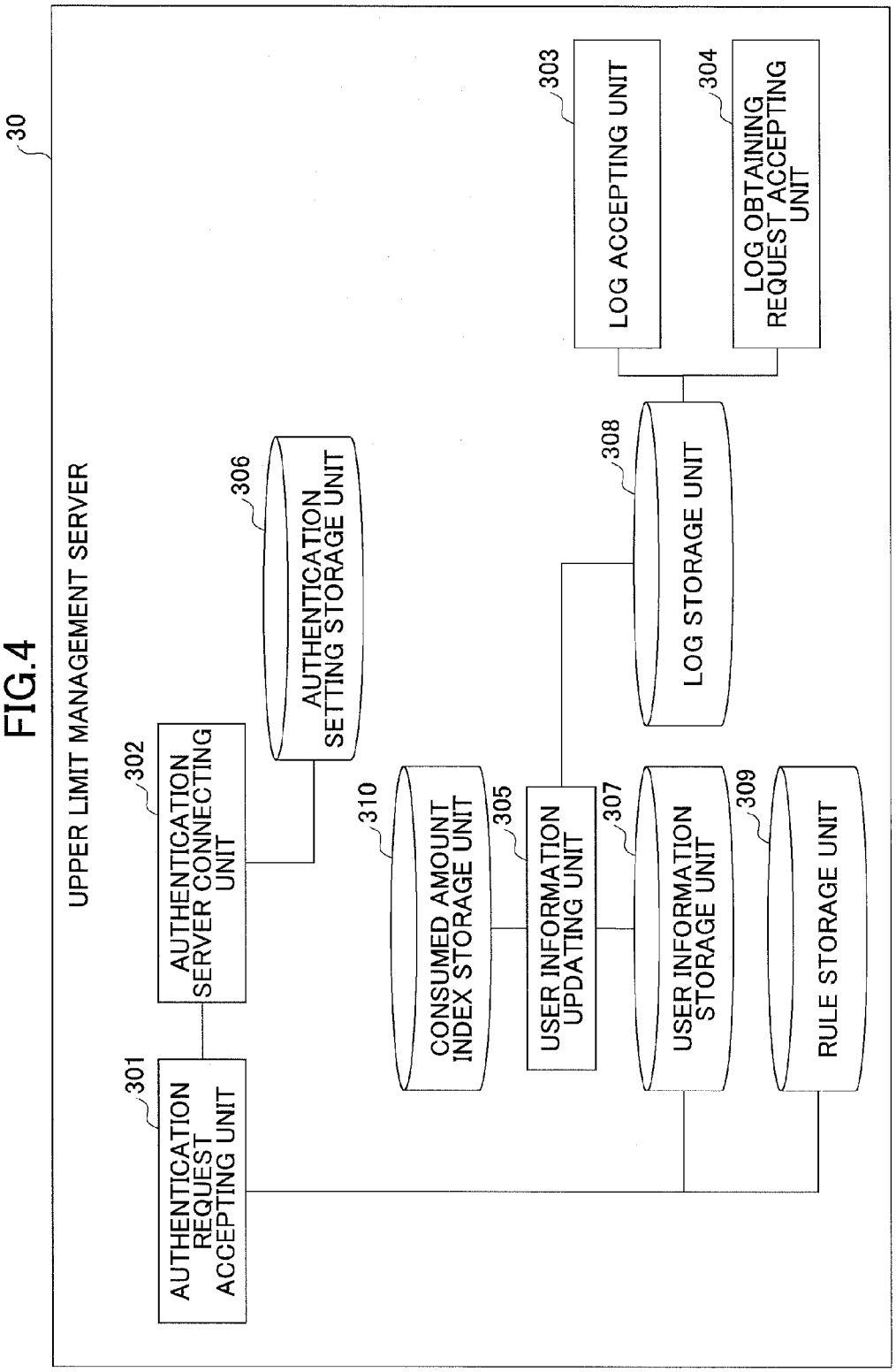
FIG. 4 is a diagram showing an exemplary functional configuration of an upper limit management server according to the embodiment of the present invention.

FIG. 4 is an exemplary functional configuration of an upper limit management server according to the embodiment of the present invention. The upper limit management server 30 shown includes an authentication request accepting unit 301; an authentication server connecting unit 302; a log accepting unit 303; a log obtaining request accepting unit 304; a user information updating unit 305, etc. These respective units are realized by a process which is caused by a program installed in the upper limit management server 30 to execute by a CPU of the upper limit management server 30. Moreover, the upper limit management server 30 includes an authentication setting storage unit 306; a user information storage unit 307; a log storage unit 308; a rule storage unit 309; a consumed amount index storage unit 310, etc. The respective storage units may be realized by an auxiliary storage unit, etc., which the upper limit management server 30 has.

The authentication request accepting unit 301 accepts an authentication request from the image forming apparatus 10 into which a log-in is attempted by a user. The authentication server connecting unit 302 requests the authentication server to execute authentication in accordance with an authentication request of the image forming apparatus 10. The authentication server 40 is specified based on identification information (for example, an IP address, etc.) of the authentication server 40 stored by the authentication setting storage unit 306.

In other words, for authentication of the user of the image forming apparatus 10, the upper limit management server intermediates between the image forming apparatus 10 and the authentication sever 40. This is because different interfaces are caused to be hidden from the respective image forming apparatuses 10 which may be provided in accordance with the type (for example, an active directory server or an LDAP server, etc.,) of the authentication server 40. In this way, if the authentication server 40 used is replaced, a range affected by the replacing may be restricted to the upper limit management server 30.

If authentication is successful, the authentication request accepting unit 301 returns rule information and user information related to the user with the successful authentication. The user information is obtained from the user information storage unit 307. The rule information is obtained from the rule storage unit 309. The user information storage unit 307 stores affiliate information (user information) of each user in association with information identifying the corresponding user. User information includes an upper limit value of a parameter (below-called "point") whose value is consumed (decreases) in accordance with usage of the image forming apparatus 10, and the present consumed amount of the point. In other words, the respective users are permitted usage of the image forming apparatus 10 within a range of an upper limit provided to the user. Basically, the consumed amount of points is determined in accordance with setting information of a job to be executed by the image forming apparatus 10. The rule information storage unit stores rule information. The rule information indicates a rule or a restriction to be applied with respect to usage of the image forming apparatus 10 (for example, execution of a printing job) in accordance with a relationship between the consumed amount and the upper limit value of the points.

The log accepting unit 303 receives from the image forming apparatus 10 and stores in the log storage unit 308 log information on a printing job to be performed by the image forming apparatus 10. The log obtaining request accepting unit 304 receives a request for obtaining log information from the user status display information 20 and returns log information stored in the log storage unit 308. Based on the log information and the consumed amount index storage unit 310, the user information updating unit 305 updates the consumed amount, etc., of the points in the user information. The consumed amount index storage unit 310 stores an index indicating a weighting for a consumed amount of the points for a setting value for a setting item which makes up setting information of a printing job.

Figure 5:
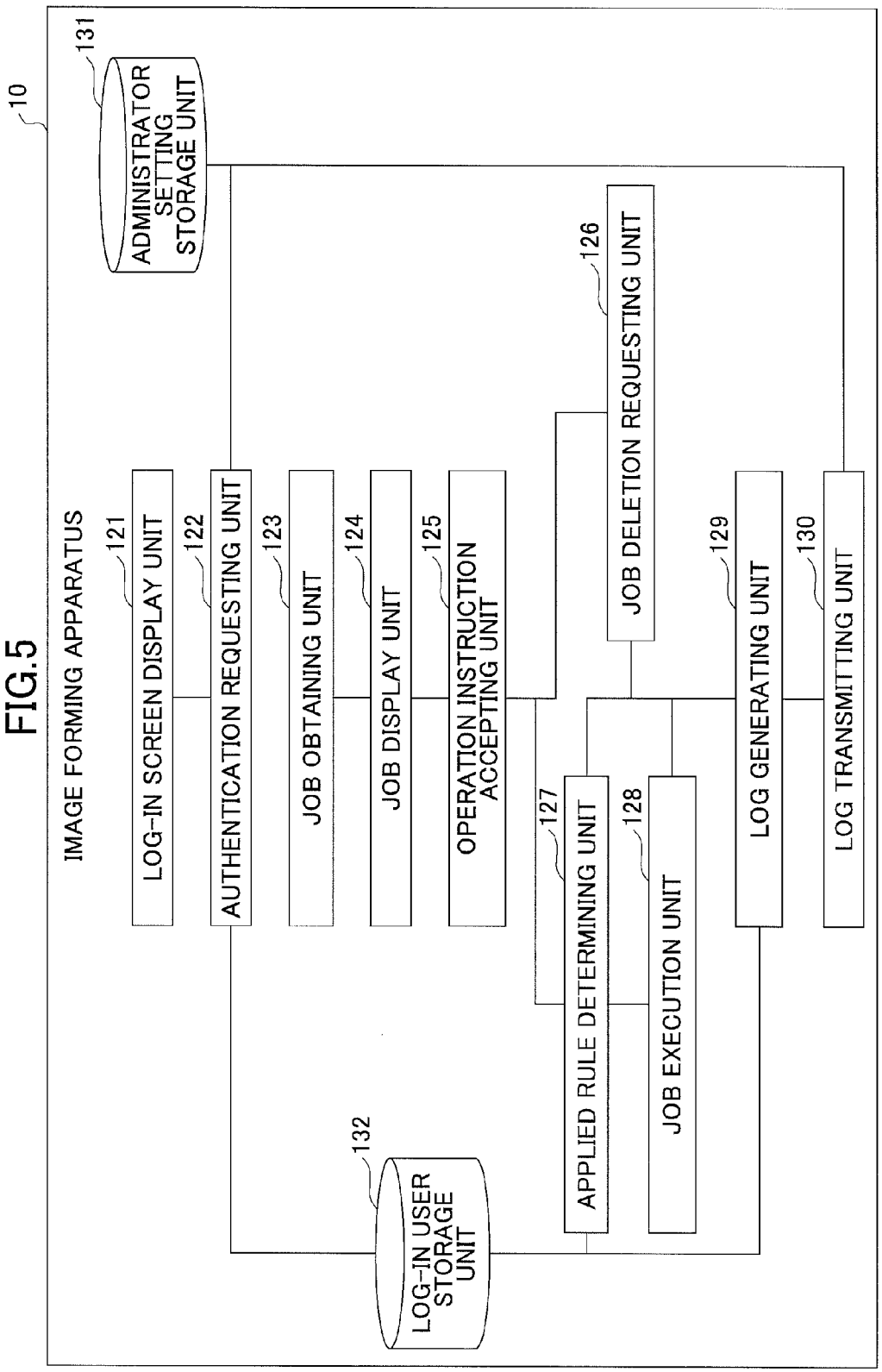
FIG. 5 is a diagram showing an exemplary functional configuration of the image processing apparatus according to the embodiment of the present invention.

FIG. 5 is a diagram showing an exemplary functional configuration of the image forming apparatus according to the embodiment of the present invention. The image forming apparatus 10 shown includes a log-in screen display unit 121, an authentication requesting unit 122, a job obtaining unit 123, a job display unit 124, an operating instruction accepting unit 125, a job deletion requesting unit 126, an applied rule determining unit 127, a job executing unit 128, a log generating unit 129, a log transmitting unit 130, etc. These respective units are realized by a process which is performed by a program installed in the image forming apparatus 10 to be executed by the CPU 111 of the image forming apparatus 10. Moreover, the image forming apparatus 10 includes an administrator setting storage unit 131 and a logged-in user storage unit 132, etc. The administrator setting storage unit 131 can be realized by using the HDD 114 or the NVRAM 115, for example. The logged-in user storage unit 132 can be realized by using the RAM 112, for example.

The log-in screen display unit 121 displays a log-in screen on the operating panel 115 and accepts an input of authentication information (e.g., user name and password) from the user via a log-in screen. In other words, the log-in screen display unit 121 specifies information identifying the user which causes the image forming apparatus 10 to execute the job. The authentication requesting unit 122 transmits an authentication request based on the input user information to the upper limit management server 30. If the authentication is successful, the authentication requesting unit 122 stores user information and rule information, etc., returned to the log-in user storage unit 132. In other words, the authentication requesting unit 122 obtains user information of the authenticated user.

The job obtaining unit 123 obtains a printing job accumulated for an authenticated user (a logged-in user) from the printing server 50. The job display unit 124 causes a listing of the obtained printing jobs onto the operating panel 15. The operating instruction accepting unit 125 accepts an input of an operating instruction (e.g., execution or deletion, etc.) for any printing job included in the list. If deletion of the printing job is instructed, the job deletion requesting unit 126 transmits a request for deleting the selected printing job to be deleted to the printing server 50. For the selected printing job to be deleted, the applied rule determining unit 127 determines whether application of a rule for the printing job is required based on rule information, and setting information (printing condition), etc., of the printing job and a consumed amount of a logged-in user's points. When application of the rule is required, the applied rule determining unit 127 also determines a rule to be applied. The application of the rule refers to rewriting (updating) a setting value for at least some of the setting items in setting information of the printing job, for example. The job executing unit 128 controls executing of the selected printing job to be executed. When the application of the rule is required, the job executing unit 128 executes the printing job after applying the rule to the printing job.

The log generating unit 129 generates log information on an operation (executing or deleting, etc.) of the printing job. The log transmitting unit 130 transmits the generated log information to the upper limit management server 30. The administrator setting storage unit 131 stores information (an IP address, etc.) identifying the authentication server 40 and information (an IP address, etc.) identifying the upper limit management server 30.

Figure 6:
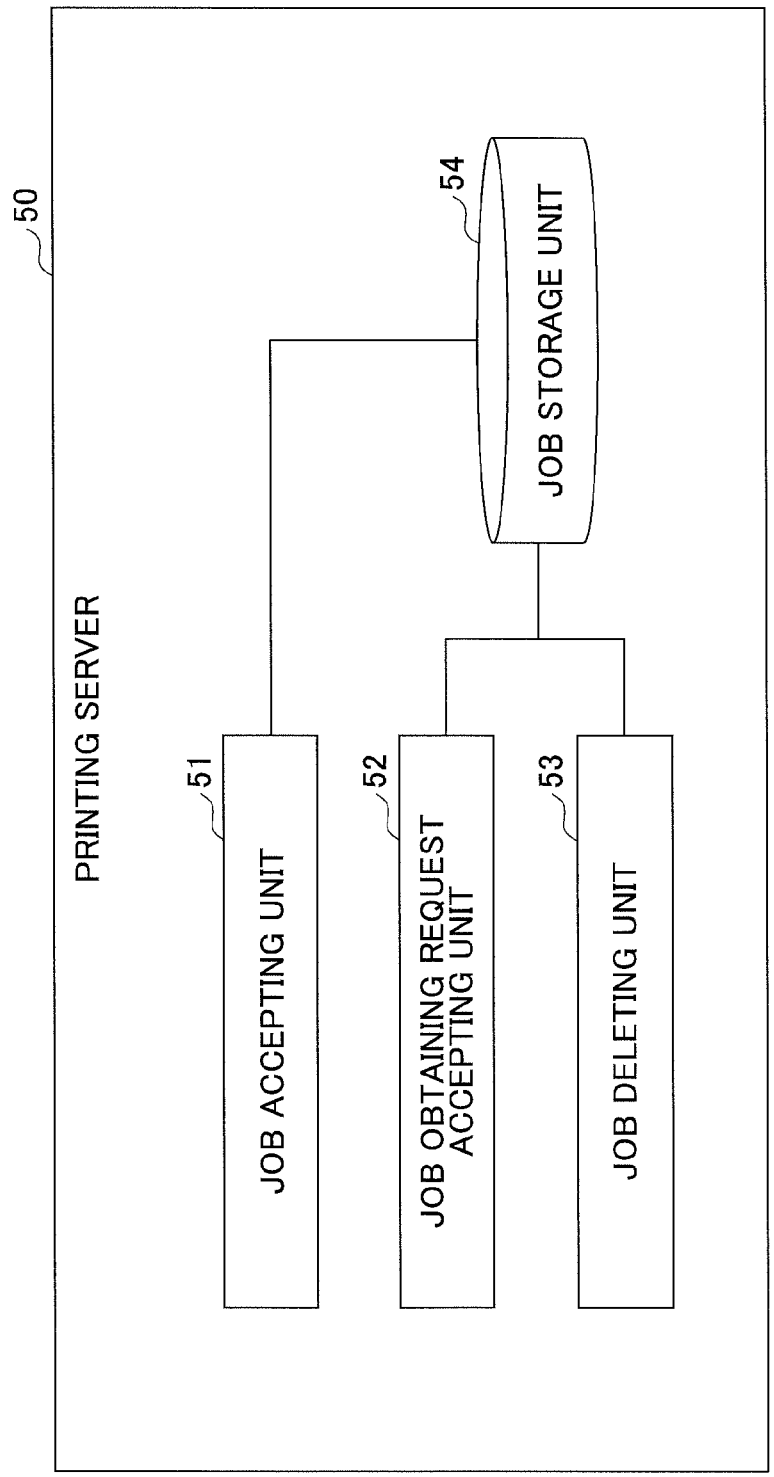
FIG. 6 is a diagram showing an exemplary functional configuration of a printing server according to the embodiment of the present invention.

FIG. 6 is a diagram showing an exemplary functional configuration of a printing server according to the embodiment of the present invention. The printing server 50 shown includes a job accepting unit 51; a job obtaining request accepting unit 52; and a job deleting unit 53. These respective units are realized by a process which is caused by a program installed in the printing server 50 being executed by a CPU of the printing server 50. Moreover, the printing server 50 includes a job storage unit 54. The job storage unit 54 may be realized by using an auxiliary storage unit, etc., which the printing server 50 has.

The job accepting unit 51 receives a printing job transferred from the user terminal 60 and stores the printing job in the job storage unit 54. The job storage unit 54 stores the respective printing jobs in association with user names of users related to the printing jobs. In response to receiving a printing job obtaining request from the image forming apparatus 10, the list of the printing jobs stored in the job storage unit 54 in association with the user name related to the obtaining request is returned. In response to receiving a printing job deleting request from the image forming apparatus 10, the job deleting unit 53 deletes the printing job related to a deleting request from the job storage unit 54. The job deleting unit 53 may periodically monitor the job storage unit 54 and automatically delete, from the job storage unit 54, a printing job for which a predetermined period has elapsed after accepting.

Figure 7:
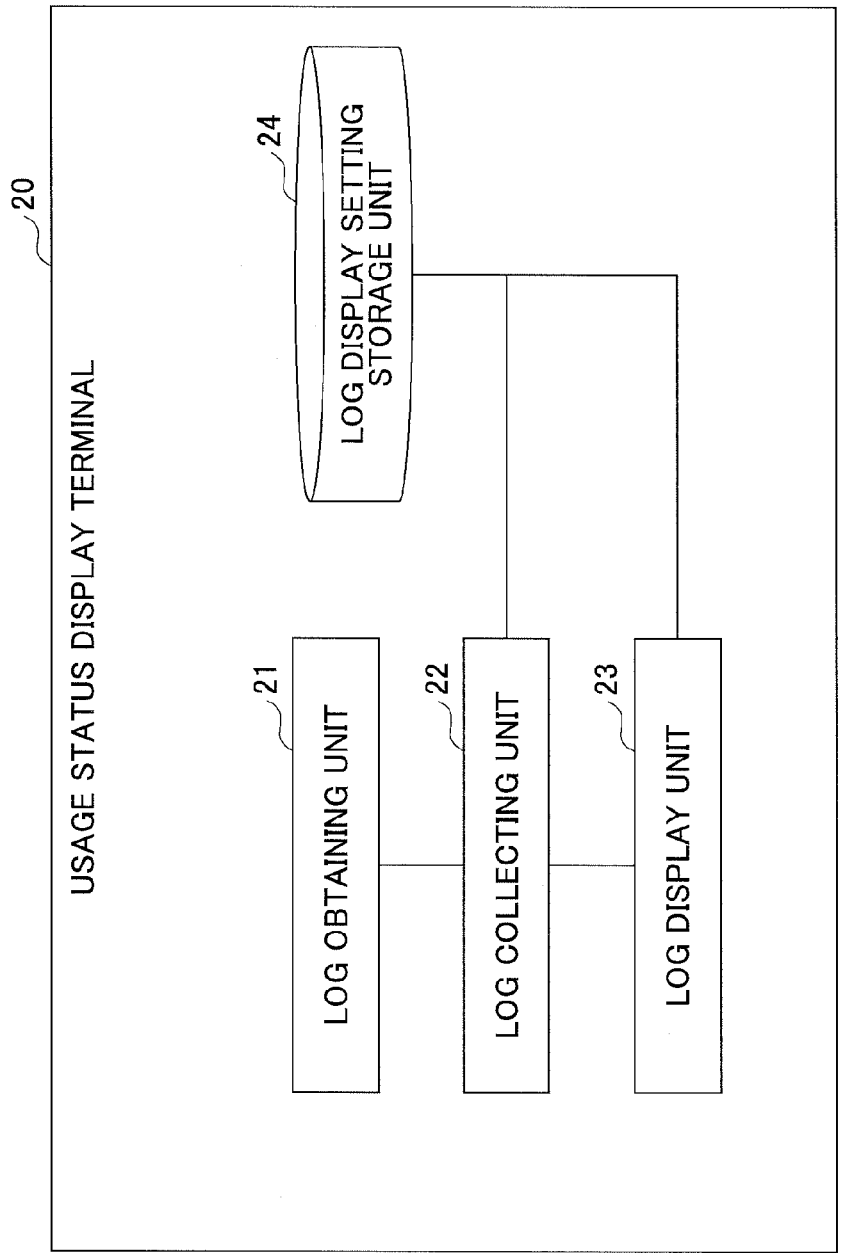
FIG. 7 is an exemplary functional configuration of a usage status display terminal according to the embodiment of the present invention.

FIG. 7 is a diagram showing an exemplary functional configuration of the usage status display terminal 20 according to the embodiment of the present invention. The usage status display terminal 20 shown includes a log obtaining unit 21, a log collecting unit 22, a log display unit 23, etc. These respective units are realized by a process which is performed by a program installed in the user status display terminal 20 to be executed by the CPU 204 of the usage status display terminal 20. Moreover, the usage status display terminal 20 includes a log display setting storage unit 24. The log display setting storage unit 24 can be realized by using the auxiliary storage apparatus 202, etc. for example.

The log obtaining unit 21 obtains log information from the upper limit management server 30. The log collecting unit collects for displaying what is in the obtained log information. A method of collecting is one that the log display setting storage unit 24 stores, for example. The log display unit 23 causes collected results of the log accumulating unit 22 to be displayed on the display unit 206. A display format is one that the log displays setting storage unit 24 stores, for example. In other words, a display mode of log information in the usage status display terminal 20 can be customized using a setting by a user for the log display setting storage unit 24.

Figure 8:
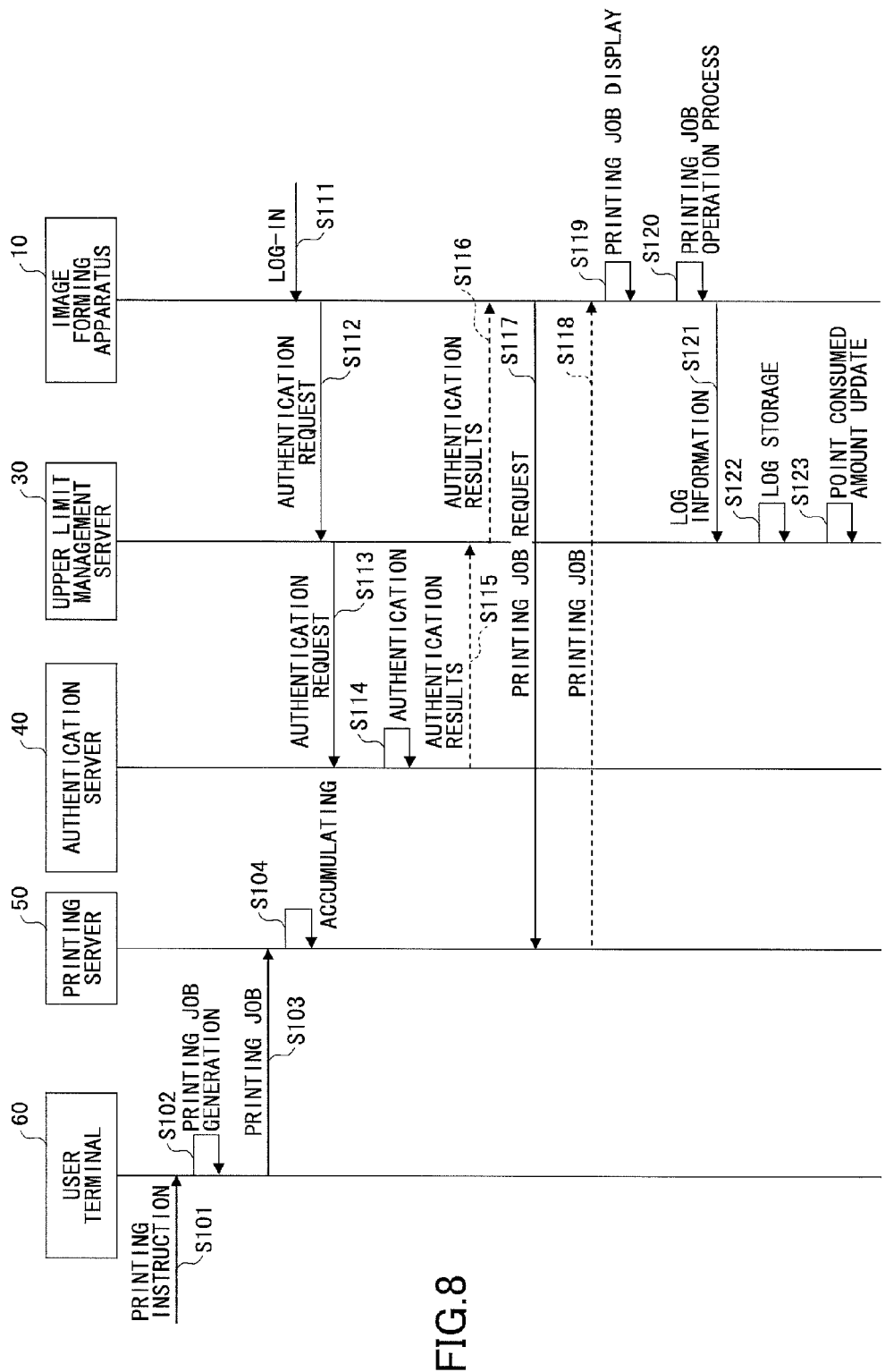
FIG. 8 is a sequence diagram for explaining an overview of a processing procedure related to a printing job.

Below, a processing procedure executed by an information processing system 1 is described. FIG. 8 is a sequence diagram for explaining an overview of a processing procedure related to a printing job.

For example, a printing instruction is input by the user for an application being launched in the user terminal 60 (S101). In the printing instruction, setting information (also called printing conditions or printing attribute) on printing is set. In response to the printing instruction, a printer driver installed in the user terminal 60 generates a printing job (printing data) related to document data to be edited in the application (S102). In the printing job is included setting information set by the user. The user terminal 60 transmits the printing job to the printing server 50 in association with a logged-in user name of the user terminal 60 (S103). The user name may be included in the printing job.

When the printing job and the user name are received at the printing server 50, the job accepting unit 51 stores the printing job in association with the user name in the job storage unit 54 (S104). In other words, the printing job is accumulated in the printing server 50.

When the printing job accumulated in the printing server is to be performed, the user moves to one of the image forming apparatuses 10. The log-in screen display unit 121 of the image forming apparatus 10 to which the user has moved accepts an input of authentication information (e.g., a user name and a password) via a log-in screen displayed on the operating panel 15. The authentication requesting unit 122 transmits an authentication request including the authentication information to the upper limit management server 30 (S112). When the authentication request is received, the authentication request accepting unit 301 of the upper limit management server 30 retrieves authentication information in response to the authentication request. The authentication server connecting unit 302 transmits an authentication request including authentication information retrieved to the authentication server 40 related to identifying information stored by the authentication setting storage unit 306.

The authentication server 40 authenticates based on authentication information included in the received authentication request and returns authentication results to the upper limit management server 30 (S115). When the authentication results are received by the authentication server connecting unit 302, the authentication request accepting unit 301 returns the authentication results to the image forming apparatus 10 (S116). Here, when the authentication results indicate successful authentication, the authentication request accepting unit 301 returns rule information and user information on the authenticated user (below called "logged-in user") with the authentication results to the image forming apparatus 10. The user information is obtained from the user information storage unit 307. The rule information is obtained from the rule storage unit 309.

FIG. 9 is a diagram illustrating an exemplary configuration of user information. The user information shown includes a user name, privilege information, an affiliated group name, an upper limit value, a consumed amount, etc.

The user name, which is a user name of a logged-in user, is used as information identifying the logged-in user. The privilege information is a name identifying a job or a function whose execution or use is permitted by the user. The affiliated group name is a name of a group to which the user belongs. For example, in a company, a department may be applied to the group. The upper limit value is an amount of points provided to a logged-in user. The consumed amount is a consumed amount of the points by the logged-in user. The consumed amount may be initialized to "0" for each specific period (for example, every month). In this case, the upper limit value is said to be the points given to the user in the period.

Moreover, FIG. 10 is a diagram illustrating an exemplary configuration of a rule storage unit. As shown, the rule storage unit 309 stores a rule to be applied in accordance with a consumed rate of the points. The consumed rate is a ratio of a consumed amount relative to the upper value. In other words, the consumed rate is an example of a relationship between the upper limit value and the consumed amount. Shown is an example in which, when the consumed rate is not below 80%, the rule (restriction) called "a forced double face" is to be applied; when the consumed rate is not below 90%, the rule (restriction) called "a forced monochrome" is to be applied; and when the rule (restriction) is 100%, the rule (restriction) called "a forced deletion" is to be applied. The "forced double face" refers to a forced selection (forced to be valid) with respect to double face printing which is one of setting items which make up the setting information of the printing job. The "forced monochrome" refers to a forced setting of a monochrome printing for a color mode which is one of setting items which make up setting information of the printing job. "Forced deletion" refers to a printing job being forced to be deleted from the printer server 50. At a relatively high consumed rate, a rule for a relatively low consumed rate also is a candidate to be applied. More specifically, for a consumed rate of 90%, "forced double face" as well as "forced monochrome" also are candidates to be applied. Therefore, when referring to a rule in accordance with the consumed rate, a rule is also included which is set for a consumed rate other than the consumed rate in question. A setting item other than a double face printing or a color mode such as aggregation may be applied as the rule. In this case, it is desirable to apply the rule to a setting item which is related to or which affects consumption of consumables such as toner, printing paper, etc.

Here, the reason that the term "candidate" is used is that it is not necessarily the case that a rule in accordance with a consumed rate of a point of a logged-in user is actually applied to a printing job to be executed by the logged-in user. Whether it is actually applied or not also depends on the setting information of the printing job. In other words, for a hypothetical printing job to which a monochrome printing is set from initially, "forced monochrome is not valid (is invalid). Therefore, in this case, even if the consumed rate of the logged-in user is 81%, the "forced monochrome" is not applied to the printing job.

In the embodiment of the present invention, rule information is to be common for all users. However, different rule information sets may be set for different users.

Returning to FIG. 8, when returned authentication results show unsuccessful authentication, the authentication requesting unit 122 of the image forming apparatus 10 rejects a log-in of a user. Therefore, in this case, step S117 and beyond are not executed. On the other hand, when the returned authentication results show successful authentication, the authentication request unit 122 stores rule information and user information returned, together with the authentication results, to the log-in user storage unit 132.

In response to the successful authentication, the job obtaining unit 123 specifies a user name of a logged-in user stored in the logged-in user storage unit 132 to transmit a request for obtaining the printing job to the printing server (S117). A job obtaining request accepting unit 52 of the printing server 50 obtains, from a job storage unit 54, a printing job associated with the user name specified in the obtaining request in response to receiving the obtaining request. The job obtaining request accepting unit 52 returns to the image forming apparatus 10 a listing of a printing job obtained (S118).

In the image forming apparatus 10, when the list of the printing jobs is received by the job obtaining unit 123, the job display unit 124 causes a screen (below called "printing job listing screen") showing a listing of the printing jobs to be displayed on the operating panel 15 (S119). For example, in the printing job listing screen is included a listing of job names of the respective printing jobs (S119). For example, in the printing job listing screen is included a listing of job names in each printing job.

Next, for a printing job selected by a user from printing jobs displayed on the printing job listing screen, a process according to the operating instruction of the user is executed (S120). For example, execution of a printing job, deletion of a printing job, etc., are conducted. Details of the process are described below. In response to execution of the process, a log generating unit 129 records log information on the executed process in the RAM 112 or the HDD 114, for example. For example, if the printing job is executed, the log information includes an identifier, etc., of the rule applied to the printing job and setting information of the printing job. When the logged-in user logs out, the log transmitting unit 130 transmits log information recorded with respect to the process executed during the log-in process to the upper limit management server (S121).

FIGS. 11A and 11B are diagrams illustrating exemplary log information related to the printing job. An example is shown of log information described in an XML (extensible Markup Language) format. The log information may also be described in a different format. In XML, a range surrounded by a starting tag and an ending tag is called an element. For the name of the element, a tag name of the starting tag is used.

In the log information shown, an accountLog element Er1 is a root element. The accountLog element Er1 includes startTime attribute, endTime attribute, etc. A value of the startTime attribute is date/time at which log information is first recorded after a log-in of a logged-in user. The value of the startTime attribute may be a logged-in date/time of the logged-in user. A value of the endTime attribute is date/time at which log information is last recorded for the logged-in user. For example, the value of the endTime attribute is updated every time the log information is recorded. The value of the endTime attribute may be logged-out date/time of the logged-in user.

The accountLog element Er1 includes one user element Eu1 and multiple account elements Eac1-Eac5 as child elements. The value ("aaa") of a name attribute of the user element Eu1 indicates a user name. In other words, it indicates a user name of a logged-in user.

One account element has a type attribute, a rule attribute, and a del attribute. The value of the type attribute indicates the type of the job. "Print" indicates a printing job. The value of the rule attribute indicates an applied rule with 1 through 4. "1" indicates forced monochrome, indicates forced double face, indicates forced monochrome and forced double face, and "4" indicates forced deletion. The value of the del attribute shows a mode of deletion when the printing job is deleted. "1" indicates deletion by an instruction of a user. "2" indicates forced deletion, or deletion by applying a rule.

Moreover, the account element includes an attributes element and a quantities element as child elements. For example, the account element Eac1 includes an attributes element Eat1 and a page element Ep1.

The attributes element, which indicates setting information of the printing job, includes as a child element an attribute element for each setting item which makes up the setting information. The attribute element includes a code attribute and a value attribute. The value of the code attribute indicates an identifier of the setting item. As values of the code attribute are shown "color", "twosides", and "size", indicating in order a color mode, a printing face, and a sheet size. The value of the value attribute indicates a value (a setting value) for the setting item. For the "color", "1" shows monochrome while "2" shows color. For the "twosides", "0" indicates front in a single face printing designation, "1" indicates front in a double face printing designation, and "2" indicates back in a double face printing designation. For the sheet size, "1" shows A4 while "2" shows A3. If the rule is applied, the value of the value attribute shows a value after changing by applying of the rule.

The value of the page element shows the number of pages printed or deleted.

The account element may be recorded for each printing job or for each unit in which the value of each attribute of the attribute element and the value of each attribute of the account element match. In the latter, in accordance with execution or deletion of a printing job in which the value of the respective attributes of the attribute element and the value of the respective attributes of the account element match, the number of pages printed or deleted is added to the value of the page element.

The account element Eac1 is log information indicating execution of a printing job to which forced monochrome is applied. The account element Eac2 is log information indicating deletion of a printing job by a user instruction in response to application of forced monochrome. As described below, when the rule is applied, an inquiry whether to permit execution of the printing job with the rule being applied is sent to the user. If the user selects deletion of the printing job in response to the inquiry, log information as indicated in the account element Eac2 is recorded. The account element Eac3 is a log indicating forced deletion of the printing job. The account element Eac4 is log information for a printing job to which are applied forced monochrome and forced double face with printing face being front. The account element Eac5 is log information for a printing job to which are applied forced monochrome and forced double face with printing face being back.

When the log information is received, the log accepting unit 303 of the upper limit management server 30 stores the log information in the log storage unit 308 (S122). Thereafter, the user information updating unit 305 updates the consumed amount in user information of the logged-in user with reference to the log information and the consumed amount index storage unit 310.

Figure 12:
FIG. 12 is a diagram illustrating an exemplary configuration of a consumed amount index storage unit.

FIG. 12 is a diagram illustrating an exemplary configuration of a consumed amount index storage unit. The consumed amount index storage unit 310 shown stores an index for calculating a consumed amount of points related to printing corresponding to one page in accordance with a value of the setting item which makes up setting information of the printing job (for each value of the setting item). For example, shown is an example in which, for color, monochrome, A4, A3, etc., indices of "3.0", "1.0", "1.0", and "2.0" are set in order.

For example, for color printing of an A4 size, the consumed amount for each page is 3.0×1.0=3.0. When the printing job is two pages, the consumed amount is 2×3.0=6.0.

The user information updating unit 305 adds the consumed amount calculated in the above to a current value of a consumed amount of a logged-in user.

Figure 13:
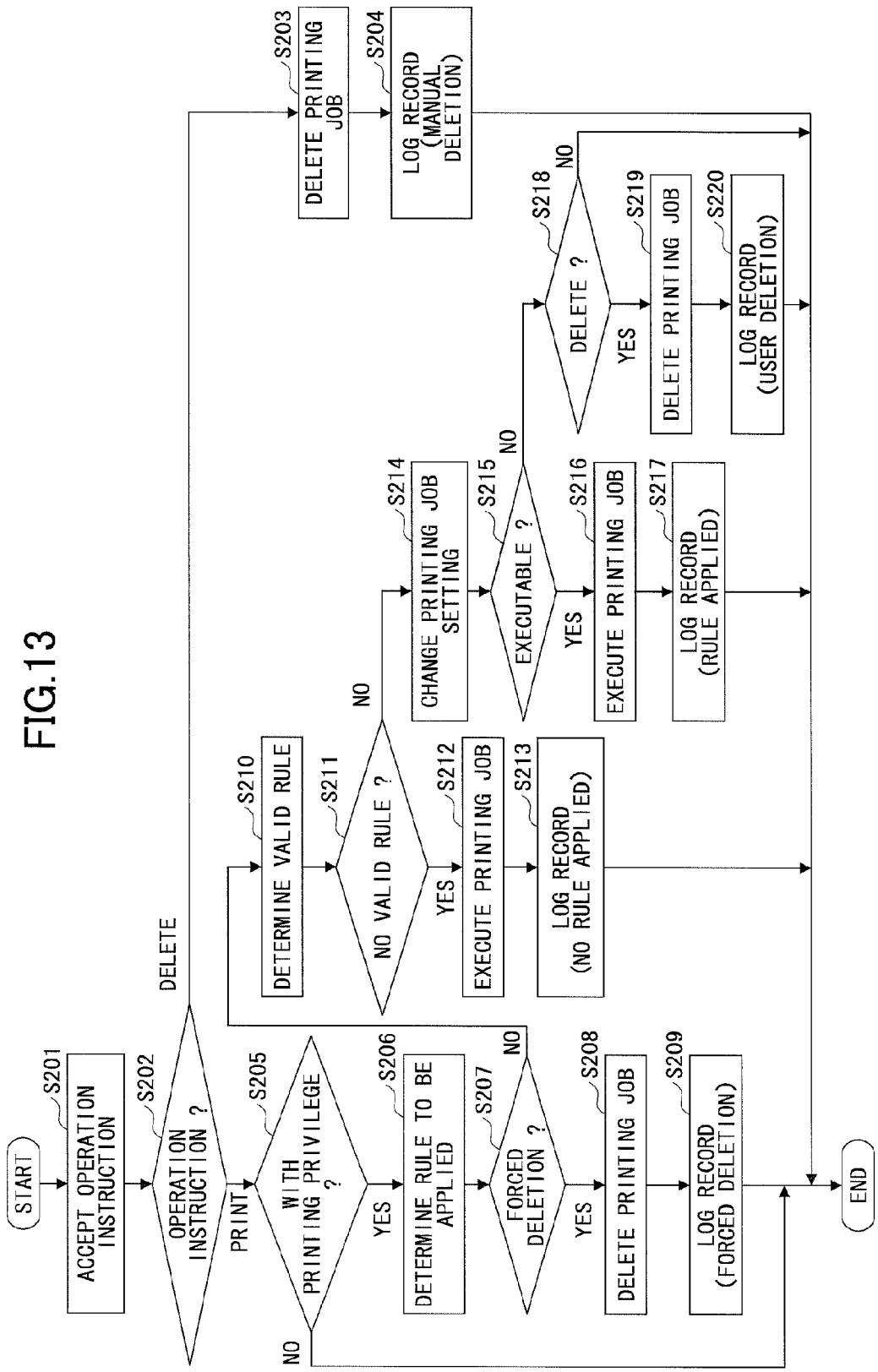
FIG. 13 is a flowchart for explaining one example of a processing procedure executed by the image forming apparatus in response to an operating instruction of the printing job.

Next, details of step S120 are described. FIG. 13 is a flowchart for explaining one example of a processing procedure executed by an image forming apparatus in response to an operation instruction of the printing job.

In step S201, the operating instruction accepting unit 125 accepts, from a user, an input of an operating instruction for a printing job (below called "a target job") selected in a printing job listing screen. As the operating instruction, execution or deletion, etc., of the target job can be selected.

If deletion of the target job is instructed ("deletion" in S202), the job deletion requesting unit 126 deletes the target job from the printing server (S203). More specifically, the job deletion requesting unit 126 transmits a deletion request of the target job to the printing server 50. The job deleting unit 53 of the printing server 50 deletes the target job from the job storage unit 54.

Thereafter, the log generating unit 129 records log information (see FIG. 11) with respect to deletion of a target job in response to an instruction of a user. In this case, a rule is not applied, an account element is recorded for which a value of the type attribute is "print", a value of the rule attribute is "0 (rule not applied)", and a value of the del attribute is "1 (deletion by user instruction)". In the attribute element is recorded setting information of the target job, while in the page element is recorded the page number of the target job.

On the other hand, if execution of the target job is instructed ("execution" in S202), the operating instruction accepting unit 125 determines whether the logged-in user has a printing privilege with reference to privilege information of user information (FIG. 9) stored in the logged-in user storage unit 132 (S205). If the logged-in user does not have a printing privilege (No in S205), the operating instruction accepting unit 125 rejects execution of the target job.

When the logged-in user has a printing privilege (Yes in S205), the applied rule determining unit 127 determines a rule to be applied as a candidate to the target job in accordance with a consumed rate of the points of the logged-in user (S206). More specifically, the applied rule determining unit 127 divides the consumed amount of user information stored in the logged-in user storage unit 132 by the upper limit value to calculate the consumed rate of the logged-in user. The applied rule determining unit 127 matches the consumed rate with rule information stored in the logged-in user storage unit 132 to determine the rule to be applied as a candidate. For example, according to an example in FIG. 10, when the consumed rate is less than 80%, it is determined that application of the rule is not needed. When the consumed rate is greater than or equal to 80% and less than 90%, it is determined that forced double face is to be applied as a candidate. When the consumed rate is greater than or equal to 90% and less than 100%, it is determined that forced double face and forced monochrome are to be applied as a candidate. When the consumed rate is greater than or equal to 100%, the forced deletion is to be applied.

When a rule to be applied as a candidate includes forced deletion ("Yes" in S207), the job deletion requesting unit 126 deletes the target job from the printing server 50 (S208). Thereafter, the log generating unit 129 records log information (see FIG. 11) with respect to forced deletion of the target job (S209). More specifically, an account element is recorded in which the value of the type attribute is "print", the value of the rule attribute is "4 (forced deletion)", and the value of the del attribute is "2 (forced deletion)". In the attribute element is recorded setting information of the target job, while in the page element is recorded the number of pages of the target job. For example, the account element Eac3 in FIG. 11 is an example of an account element recorded in step S209.

For the forced deletion, the job deletion requesting unit 126 may cause a screen for inquiring of a user whether to permit forced deletion to be displayed on the operating panel 15. It may be arranged such that the job deletion requesting unit 126 executes deletion of a printing job if an input indicating permission is made by the user, and, it does not execute deletion of the printing job if an input which indicates non permission is made.

When forced deletion is not included in the rule to be applied (No in S207) as a candidate, the applied rule determining unit 127 determines a valid rule for setting information of a target job from rules to be applied. In other words, a valid rule is extracted for setting information of a target job from rules to be applied. A rule such that application thereof causes setting information of the target job to be changed is determined to be a valid rule. In other words, a rule such that a changed value thereof and a value of the setting item in setting information of the target job differ with respect to the setting item to be changed by the rule is determined to be a valid rule. On the other hand, a rule which does not cause a change to setting information of the target job even when the rule is applied is determined to be an invalid rule. In other words, a rule such that a changed value thereof and a value of the setting item in setting information of the target job match with respect to the setting item to be changed by the rule is determined to be an invalid rule.

When there is no valid rule (Yes in S211), the job executing unit 128 executes a target job in accordance with initial setting information (S212). A case, such that there is no rule to be applied as a candidate in the first place, is also included in a case such that there is no valid rule. Thereafter, the log generating unit 129 records log information (see FIG. 11) with respect to execution of a target job to which a rule is not applied (S213). More specifically, an account element is recorded in which the value of the type attribute is "print", the value of the rule attribute is "0 (rule not applied)", and the value of the del attribute is "0 (no deletion)". In the attribute element is recorded setting information of the target job, while in the page element is recorded the number of pages of the target job.

When there is a valid rule (No in S211), the job executing unit 128 applies a valid rule to setting information of the target job (S214). As a result, the setting information is changed. For example, the color mode is changed from "color" to "monochrome", and "single face printing" is changed to "double face".

Thereafter, the job executing unit 128 inquires of the user whether to permit execution of a target job after the valid rule is applied (S215). More specifically, the job executing unit 128, for example, includes a listing of valid rules, and causes a screen for inputting whether to permit execution of a target job to which are applied all rules included in the listing to be displayed on the operating panel 15. When permission to execute the target job via the screen is input (Yes in S215), the job executing unit 128 executes a target job in accordance with changed setting information (S216). Thereafter, the log generating unit 129 records log information (see FIG. 11) with respect to execution of the target job to which a rule is applied (S217). More specifically, an account element is recorded in which the value of the type attribute is "print", the value of the rule attribute is a value in accordance with the rule, and the value of the del attribute is "0 (no deletion)". In the attribute element is recorded setting information after changing of the target job, while in the page element is recorded the number of pages of the target job. For example, the account elements Eac1, Eac4, and Eac5 in FIG. 11 are examples of account elements recorded in step S217.

On the other hand, when a non-permission (rejection) of execution of the target job is input (No in S215), the job executing unit 128 inquires of the user whether deletion of the target job is needed (S218). More specifically, the job executing unit 128 causes a screen for a user to select whether the target job is needed to be displayed on the operating panel 15. In other words, when there is no plan to execute the target job if printing may not be performed with desired setting information, the target job is deleted to reduce consumed amount of the job storage unit 54 of the printing server 50.

When an instruction to delete is input by the user (Yes in S218), the job deletion requesting unit 126 deletes the target job from the printing server 50 (S219). Thereafter, the log generating unit 129 records log information (see FIG. 11) with respect to forced deletion of the target job (S220). More specifically, an account element is recorded in which the value of the type attribute is "print", the value of the rule attribute is a value in accordance with the applied rule, and the value of the del attribute is "1 (user instructed deletion)". In the attribute element is recorded setting information after changing of the target job, while in the page element is recorded the number of pages of the target job. For example, the account element Eac2 in FIG. 11 is an example of an account element recorded in step S220.

The process in FIG. 13 is repeated until the logged-in user logs out. As a result, the log-in information on the logged-in user is accumulated in the RAM 112 or the HDD 114, for example. In the above-described step S121 in FIG. 8, the accumulated log information is transmitted to the upper limit management server 30 in a format shown in FIG. 11, for example. The log information may be transmitted to the upper limit management server 30 every time the log information is transmitted.

According to the log information in FIG. 11, whether setting a relatively low cost setting value such as monochrome, double face printing, etc., is made by applying a rule or by user intention may be distinguished or determined. Moreover, whether deletion of the printing job is performed by applying the rule or by user intention may be distinguished or determined. Moreover, whether deletion of a printing job that is performed by user intention is promoted by applying the rule or based on intention of the user from initially may be distinguished or determined.

Figure 14:
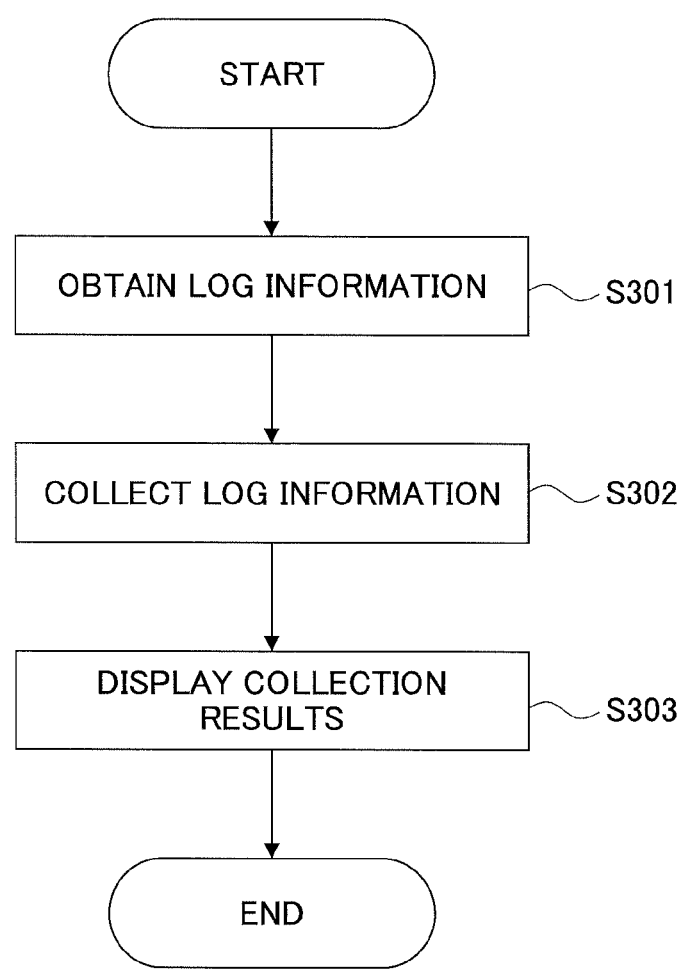
FIG. 14 is a flowchart for explaining one example of a processing procedure executed by a user status display terminal.

Thereafter, the process executed by the usage status display terminal 20 is described. FIG. 14 is a flowchart for explaining one example of a processing procedure executed by a user status display terminal.

In the usage status display terminal 20, when an instruction to display log information is input by the user, the log obtaining unit 21 obtains log information from the upper limit management server 30 (S301). More specifically, the log obtaining unit 21 transmits a request for obtaining log information to the upper limit management server 30. In the obtaining request may be specified screening conditions, etc., on the log information. For example, the type of the job, a period of the log information that is to be obtained, or a user name, a group name, etc., may be specified as screening conditions. The user may be asked to input the screening conditions before transmitting the obtaining request. In response to the obtaining request, the log obtaining request accepting unit 304 of the upper limit management server 30 obtains log information from the log storage unit 308, and returns the log information.

When the screening conditions are specified, the log obtaining request accepting unit 304 obtains from the log storage unit 308 and returns log information matching the screening conditions. For example, when the type (print or copy, etc.) of the job is specified for the screening conditions, the log obtaining request accepting unit 304 obtains log information (account element) in which a value of the type attribute matches the type in question. Moreover, when a period is specified for the screening conditions, the log obtaining request accepting unit 304 obtains log information in which a part or all of periods divided by a value of endTime attribute and a value of startTime attribute of the accountLog element Er1 are included in a specified period. Moreover, when a user name is specified for the screening conditions, the log obtaining request accepting unit 304 obtains log information in which the value of the name attribute of the user element Eu1 matches the user name specified. Furthermore, when a group name is specified for the screening conditions, the log obtaining request accepting unit 304 specifies a user name of a user belonging to a group related to the group name based on user information stored in the user information storage unit 307. The log obtaining request accepting unit 304 obtains log information in which the value of the name attribute of the user element Eu1 matches a user name specified. A different condition may be specified as a screening condition.

Thereafter, the log collecting unit 22 collects obtained log information based on a collecting method stored in the log display setting storage method 24 (S302). For example, a collecting process according to a specified collecting method may be implemented in a program module which has a predetermined interface and which can be dynamically linked and may be stored in a log display setting storage unit 24. In this case, the log collecting unit 22 calls the program module to cause the program module to execute collecting of the log information. In this way, a customer specific collecting method may be realized relatively easily.

Thereafter, the log display unit 23 causes the display apparatus 206 to display collecting results in accordance with a display format stored in the log display setting storage unit 24

(S303). For example, a display process in accordance with the display format may be implemented in a program module which has a predetermined interface and which can link dynamically and may be stored in a log display setting storage unit 24. In this case, the log display unit 23 calls the program module to cause the program module to execute displaying of collection results. In this way, a display in accordance with a customer specific display format may be implemented relatively easily.

FIG. 15 is a diagram illustrating an exemplary display format of results of collecting log information. Shown is an example in which setting information of the printing job is classified by a combination of color mode (color or monochrome) and whether printing is double face (single face or double face) and in which a percentage of the number of printed sheets of each classification and a percentage of the number of sheets which were not printed by deletion of the printing job are displayed in a circle graph.

In the log information (FIG. 11), the color mode can be determined based on a value of "attribute" attribute whose value of a code attribute is "color". Whether double face printing or not can be determined based on a value of an "attribute" attribute whose value of a code attribute is "two-sides".

In the circle graph shown, when an area of any classification is clicked with a mouse, for example, the log display unit 23 displays a blowout which shows a detailed breakdown for the classification. Shown, for convenience, are a blowout d1 displayed when "monochrome (double face)" is clicked and a blowout d2 displayed when "job deletion" is clicked.

For example, according to the blowout d1, it is seen that, by applying a rule, the number of pages which were changed to double face printing in a forced manner is 300 pages, the number of pages which were changed to monochrome in a forced manner is 100 pages, and the number of pages which were changed to double face and monochrome in a forced manner is 400 pages. Moreover, it is seen that, in accordance with user intention (rule not applied), the number of pages for which double face and monochrome printing are designated is 200 pages.

From the above, it is seen that the number of pages changed from color printing to monochrome printing is 500 pages, while the number of pages changed from single face printing to double face printing is 700 pages. As a result, it is seen that, with a rule application, a reduction effect is achieved with respect to color toner corresponding to 500 pages and 700 of printing sheets.

The above-described breakdown may be collected based on page attribute, "attribute" attribute and rule attribute of the account element of the log information.

Moreover, according to the blowout d2, it is seen that the number of pages with respect to the printing job which is deleted as a further change of setting information in accordance with application of a rule is 300+100+400=800 pages. Moreover, it is seen that the number of pages with respect to the printing job deleted in accordance with the rule of forced deletion is 500 pages. Moreover, it is seen that the number of pages with respect to the printing job deleted in accordance with a deletion instruction due to user intentions is 200 pages.

In light of the above, it is seen that a reduction effect is obtained with respect to printing sheets corresponding to 300+100+400+500+200=1500 sheets. Of these, it is seen that 300+100+400+500=1300 pages represent an effect of application of a rule, while 200 pages represent an effect of accumulated document printing function. Therefore, in this case, an administrator may grasp that applying the rule is effective. Here, the effect due to the accumulated document printing function is an effect for a case such that a printing instruction immediately causes printing. In other words, according to the accumulated document printing function, the user may delete a printing job with respect to the printing instruction later even when an erroneous printing instruction is made. Moreover, even when there is not an erroneous printing instruction, execution of the printing job may become unnecessary during a time during which the printing job is actually executed. As a result, execution of a wasteful printing job may be reduced.

When deletion of a printing job is automatically executed by the printing server 50, log information for such a deletion may also be recorded to be collected.

Moreover, while an example is shown of recording setting information after rule application in the log information in the present embodiment, setting information before the rule application may be recorded. In this case, contents of the setting information after the rule application may be specified by the upper limit management server 30 or the usage status display terminal 20.

As described above, the embodiment of the present invention makes it possible to make further cost reduction with respect to the usage of the image forming apparatus 10. Moreover, log information including setting information of the printing job, cause of deletion of the printing job (rule application or user operation), and applied rule may be recorded to assist in grasping the factors of cost reduction.

While a printing job is described as an example in the present embodiment, the present embodiment can also be applied with respect to an image processing-type job which uses printing sheet, toner, etc., a FAX receiving job or a copying job, etc. For example, for a copying job, the job is input via the operating panel 15, and the copying job differs from the printing job in that setting information is set via the operating panel 15, while for other points, it may be similar to the processing procedure described above except for points of change within an obvious range. Moreover, the feature of the log information may also be similar to the printing job.

For example, FIG. 16 is a diagram illustrating exemplary log information related to the copying job. Shown for convenience is only an account element related to the copying job. The reason is that the accountLog element, the user element, etc., do not depend on the job type.

As shown, even for a copying job, the log information is described with a format (or a syntax) which is similar to the printing job except that a value of the type attribute becomes "copy". The copying job shown shows an example in which forced monochrome is applied.

When the log information is recorded from the user logging in to logging out, log information (account element) on the copying job and log information (account element) on the printing job may be recorded in a mixed state in the RAM 112 or the HDD 114.

Moreover, the embodiment of the present invention may be applied to an information processing apparatus which consumes consumables, which information processing apparatus is an electronic apparatus or an apparatus other than the image forming apparatus 10.

Moreover, while an example in which a user name and a password are input is shown in the above with respect to authentication of a user, the user may be authenticated by card authentication using a magnetic card or an IC card (below called simply "a card"). In this case, the log-in screen display unit 121 of the image forming apparatus 10 may be replaced by a card ID receiving unit (not shown) which receives, via a card reader, an ID recorded in a card (below called "a card ID"). The authentication requesting unit 122 transmits, to the upper limit management server 30, an authentication request which includes the card ID received by the card ID receiving unit. The authentication request accepting unit 301 of the upper limit management server 30 converts the card ID into the user name and the password. For example, the card ID and the password may be further included in the user information stored by the user information storage unit 307. The authentication request accepting unit 301 converts the card ID to the user name and a password by obtaining the user name and the password from user information including the card ID included in the authentication request. The subsequent process is as described above.

Moreover, in the present embodiment, the user terminal 60 and the usage status display terminal 20 may be implemented by one computer. Functions of the upper limit management server 30, the authentication server 40, and the printing server 50 may be implemented in one computer. Moreover, functions of the upper limit management server 30, the authentication server 40, and the printing server 50 may be included in the image forming apparatus 10. Furthermore, functions of the usage status display terminal 20 may be included in the image forming apparatus 10. In this case, collection results of log information may be displayed on the operating panel 15 of the image forming apparatus 10.

In the present embodiment, the image forming apparatus 10 is an example of an information processing apparatus. The log-in screen display unit 121 or the card ID receiving unit is an example of a user specifying unit. The authentication requesting unit 122 is an example of user information obtaining unit. The applied rule determining unit 127 is an example of an applied rule determining unit. The job executing unit 128 is an example of an applying unit. The log generating unit 129 is an example of a log recording unit. The job obtaining unit 123 is an example of a job obtaining unit. The job display unit 124 is an example of a job display unit. The operating instruction accepting unit 125 is an example of an accepting unit. The job deleting unit 126 is an example of a deleting unit.

Moreover, the usage status display terminal 20 is an example of an information display apparatus. The log collecting unit 22 is an example of a collecting unit. The log display unit 23 is an example of a display control unit.

While embodiments of the present invention are described, the present invention is not limited to such specific embodiments, so that variations and changes are possible within the scope of the gist of the present invention that is recited in the claims.

The present application is based on Japanese Priority Application No. 2011-157178 filed on Jul. 15, 2011, the entire contents of which are hereby incorporated by reference.

The invention claimed is:

1. An information processing apparatus which executes a job in accordance with setting information that describes one or more printing attributes of the job, the information processing apparatus comprising:
   memory storing computer-readable instructions; and
   one or more processors configured to execute the computer-readable instructions such that the one or more processors are configured to perform operations including,
   specifying identifying information of a user which causes the information processing apparatus to execute the job;
   obtaining a consumed amount of the executed job relative to an upper limit value in association with the identifying information;
   accepting an execution instruction of the job based on setting information of the job, the setting information consisting of a first setting value to one or more setting items, the first setting value being set by the user;
   determining whether a rule to be applied to an accepted job exists or not from among one or more rules, at least one of the one or more rules setting a second setting value to at least one of the one or more setting items;
   applying the second setting value to the setting information of the accepted job based on the applied rule when the applied rule determining unit determines the applied rule exists;
   executing the accepted job; and
   recording log information of the executed job, the log information indicating that the rule is applied to the executed job when the applied rule exists and the setting information of the accepted job is changed from the first setting value to the second setting value and that the rule is not applied to the executed job when the applied rule exists and the setting information of the accepted job is not changed because of match the first setting value and the second setting value.

2. The information processing apparatus as claimed in claim 1, wherein the one or more processors are further configured to perform operations including referring to rule information in which is recorded the rule to be applied with respect to the execution of the job in accordance with the relationship between the upper limit value and the consumed amount, determining one or more candidates of the rule to be applied to the user, and extracting the rule which is valid for the setting information of the job to be executed of the candidates, the valid rule referring to a rule where a first setting value of the job to be executed differs a second setting value which is defined in the rule, and
   applying the valid rule to the job to be executed.

3. The information processing apparatus as claimed in claim 1, wherein the one or more processors are further configured to perform operations including
   obtaining a listing of the jobs stored by a predetermined storage unit;
   displaying the listing of the obtained jobs;
   accepting, from the user, a selection of the job to be executed or the job to be deleted; and
   deleting, from the predetermined storage unit, the job selected as the job to be deleted,
   and recording log information indicating that the job deleted has been deleted by an instruction of the user.

4. The information processing apparatus as claimed in claim 1, wherein the one or more processors are further configured to perform operations including
   displaying a job list screen in a display unit to select an operation target job from among one or more jobs accumulated in a storage apparatus;
   accepting a deletion instruction of the selected job in accordance with user operation via the job list screen;
   deleting the selected job in the storage apparatus in response to the deletion instruction; and
   requesting the deletion instruction of the accepted job to the deletion unit without executing the accepted job based on applying the applied rule, and
   recording log information of the deleted job distinguishing between deletion of the selected job in response to the deletion instruction in accordance with the user operation via the job list screen and deletion of the accepted job in response to the requested deletion instruction.

5. The information processing apparatus as claimed in claim 4, wherein the one or more processors are further configured to perform operations including displaying, when the first setting value of the setting information of the accepted job is changed to the second setting value, displaying a selection screen in the display unit for the user to select whether to delete the accepted job, and requesting the deletion instruction of the accepted job when the deletion instruction to the accepted job is accepted in accordance with the user operation via the selection screen.

6. The information processing apparatus as claimed in claim 5, wherein at least one of the rules defines the deletion of the job, and the one or more processors are further configured to perform operations including applying the deletion of the accepted job when the applied rule defines the deletion of the job, requesting the deletion instruction of the accepted job upon the deletion of the accepted job, and recording log information of the deleted job distinguishing between deletion of the accepted job in response to the deletion instruction in accordance with the user operation via the selection screen and deletion of the accepted job in response to the deletion instruction by applying the rule defining the deletion of the job.

7. The information processing apparatus as claimed in claim 1, wherein the one or more processors are further configured to perform operations including determining the rule to be applied to the user by referring rule information in which the rule applied to execution of the job in accordance with relationship between the upper limit value and the consumed amount, and recording, when the rule is applied, log information including applied rule information indicating the applied rule and at least one of the setting information before the rule is applied and the setting information after the rule is applied, and, when the rule is not applied, record long information including the applied rule information indicating that the rule is not applied.

8. The information processing apparatus as claimed in claim 1, wherein in the rule information is recorded, as the rule, a setting value to be applied to the setting information in accordance with the relationship between the upper limit and the consumed amount.

9. The information processing apparatus as claimed in claim 1, wherein the relationship between the upper limit and the consumed amount refers to a ratio of the consumed amount to the upper limit value.

10. A method which executes a job by an information processing apparatus, the method comprising:

a user specifying step which specifies identifying information of a user which causes the information processing apparatus to execute the job;

a user information obtaining step which obtains a consumed amount of the executed job relative to an upper limit value in association with the identifying information from a server;

an applied rule determining step which determines a candidate rule to be applied to setting information that describes one or more printing attributes of the job based on the consumed amount of the user;

accepting an execution instruction of the job based on the setting information of the job, the setting information consisting of a first setting value to one or more setting items, the first setting value being set by the user;

determining via a processor whether a rule to be applied to the accepted job exists or not from among one or more rules stored in a memory, at least one of the one or more rules setting a second setting value to at least one of the one or more setting items;

applying, when it is determined that the applied rule exists, the second setting value to the setting information of the accepted job based on the applied rule;

executing the accepted job by the information processing apparatus; and recording log information of the executed job, the log information indicating that the rule is applied to the executed job when the applied rule exists and the setting information of the accepted job is changed from first setting value to the second setting value and that the rule is not applied to the executed job when the applied rule exists and the setting information of the accepted job is not changed because of match the first setting value and the second setting value.

11. The method as claimed in claim 10, further comprising:

displaying a job list screen in a display unit to select an operation target job from among one or more jobs accumulated in a storage apparatus;

accepting a deletion instruction of the selected job in accordance with user operation via, the job list screen;

deleting the selected job in the storage apparatus in response to the deletion instruction; and requesting the deletion instruction of the accepted job to the deletion unit without executing the accepted job based on applying the applied rule, wherein recording log information includes recording log information of the deleted job distinguishing between deletion of the selected job in response to the deletion instruction in accordance with the user operation via the job list screen and deletion of the accepted job in response to the deletion instruction requested by the deletion requesting unit.

12. The method as claimed in claim 11, further comprising:

displaying a selection screen in the display unit for the user to select whether to delete the accepted job when the first setting value of the setting information of the accepted job is changed to the second setting value by the applying unit, and requesting the deletion instruction of the accepted job when the deletion instruction to the accepted job is accepted in accordance with the user operation via the selection screen.

13. The method as claimed in claim 12, wherein when at least one of the rules defines the deletion of the job, applying the deletion of the accepted job when the applied rule defines the deletion of the job, requesting the deletion instruction of the accepted job, and recording log information of the deleted job distinguishing between deletion of the accepted job in response to the deletion instruction in accordance with the user operation via the selection screen and deletion of the accepted job in response to the deletion instruction by applying the rule defining the deletion of the job.

14. The method as claimed in claim 10, further comprising:

specifying information identifying a user which causes the information processing apparatus to execute the job; and obtaining a consumed amount of the executed job relative to an upper limit value in association with the identifying information, determining the rule to be applied to the user by referring rule information in which the rule applied to execution of the job in accordance with relationship between the upper limit value and the consumed amount, and when the rule is applied, recording log information including applied rule information indicating the applied rule and at least one of the setting information before the rule is applied and the setting information after the rule is applied, and, when the rule is not applied, record long information including the applied rule information indicating that the rule is not applied.

15. The method as claimed in claim 14, further comprising referring to rule information in which a rule is recorded to be applied to execution of the job in accordance with the relationship between the upper limit value and the consumed amount, determine one of more candidates of the rule to be applied to the user, and extracting the rule which is valid for the setting information of the job to be executed among candidates, the valid rule referring to a rule where a first setting value of the job to be executed differs a second setting value which is defined in the rule, and applying the valid rule to the job to be executed.

16. The method as claimed in claim 14, further comprising:
   obtaining a listing of the jobs stored by a predetermined storage unit;
   displaying the listing of the obtained jobs;
   accepting, from the user, a selection of the job to be executed or the job to be deleted;
   deleting, from the predetermined storage unit, the job selected as the job to be deleted; and
   recording log information indicating that the deleted job has been deleted by an instruction of the user.

17. The method as claimed in claim 16,
   storing the deletion of the job described as the rule in accordance with the relationship between the upper limit value and the consumed amount,
   deleting the job to be executed from the predetermined storage unit when the determined rule is deletion of the job, and
   recording log information indicating that the job deleted based on the rule has been deleted according to the rule.

18. The method as claimed in claim 17, wherein in the rule information is recorded, as the rule, applying a setting value with respect to a setting item related to consumption of a consumable of the setting items which make up the setting information in accordance with the relationship between the upper limit value and the consumed amount.

19. The method as claimed in claim 17, wherein in the rule information is recorded, as the rule, a setting value to be applied to the setting information in accordance with the relationship between the upper limit and the consumed amount.

20. A non-transitory computer readable medium having recorded thereon instructions which cause an information processing apparatus which executes a job to execute:
   a user specifying step which specifies identifying information of a user which causes the information processing apparatus to execute the job;
   a user information obtaining step which obtains a consumed amount of the executed job relative to an upper limit value in association with the identifying information;
   an applied rule determining step which determines a candidate rule to be applied to setting information that describes one or more printing attributes of the job based on the consumed amount of the user;
   an applying step which changes the setting information of the job to be executed by applying the rule determined in the applied rule determining step; and
   a log recording step which records, with respect to the job to be executed or deleted, log information which includes the setting information of the job when the job is executed and deletion information when the job is deleted, wherein the log information includes applied rule information indicating the rule applied to the job when the setting information of the job is changed by applying the rule or the job is deleted by applying the rule, and wherein the applied rule information indicating the rule to be applied also includes information indicating whether a rule has been applied.

* * * * *